United States Patent
Gabriel et al.

(10) Patent No.: US 9,828,964 B1
(45) Date of Patent: Nov. 28, 2017

(54) CALIBRATION OF ENGINE AUTO-STOP DELAY TIMES

(71) Applicant: Ford Global Technologies, LLC, Dearborn, MI (US)

(72) Inventors: David Crist Gabriel, Troy, MI (US); Cathleen Tistle, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 7 days.

(21) Appl. No.: 15/219,445

(22) Filed: Jul. 26, 2016

(51) Int. Cl.
*F02N 11/08* (2006.01)

(52) U.S. Cl.
CPC ...... *F02N 11/0833* (2013.01); *F02N 11/0862* (2013.01); *F02N 2200/061* (2013.01)

(58) Field of Classification Search
CPC ............. F02N 11/0833; F02N 11/0862; F02N 11/0825; F02N 2200/061

USPC ............... 123/179.3, 179.4; 701/112, 113
See application file for complete search history.

(56) References Cited

U.S. PATENT DOCUMENTS

| 2015/0159613 A1 | 6/2015 | Jensen et al. |
| 2016/0101775 A1 | 4/2016 | Gibson et al. |
| 2017/0107963 A1* | 4/2017 | Khafagy ............. F02N 11/0833 |

* cited by examiner

*Primary Examiner* — Hai Huynh
(74) *Attorney, Agent, or Firm* — David B. Kelley; Brooks Kushman P.C.

(57) ABSTRACT

A auto-stop/start vehicle with an engine and a battery includes at least one controller that calibrates an engine auto-stop delay time based on a state of charge (SOC) of a battery. The calibrated engine auto-stop delay time increases as the SOC of the battery decreases, and decreases as the SOC of the battery increases. The controller further initiates shutdown of an engine upon expiration of the calibrated engine auto-stop delay time.

16 Claims, 2 Drawing Sheets

| SOC [%] | Delay [sec] |
|---|---|
| 100 | 0 |
| 90 | 0 |
| 80 | 1 |
| 70 | 3 |
| 60 | 7 |
| 50 | 13 |
| 40 | 23 |
| 30 | 39 |
| 20 | 88 |
| 10 | 250 |
| 0 | 1000 |

CALIBRATION OF ENGINE AUTO-STOP DELAY TIMES

TECHNICAL FIELD

This disclosure relates to processes, methods, algorithms, and systems for calibrating engine auto-stop delay times as a function of a state of charge of a battery in hybrid vehicles or other similarly arranged vehicles.

BACKGROUND

There are many instances when a vehicle stops before its destination is reached during a typical driving event. This may occur, for example, when the vehicle stops at traffic signals, cross-walks, stop signs, and the like. An auto-stop/start vehicle may enable a stop/start strategy for starting and stopping the vehicle engine during a drive cycle. The engine is shut down if no power is required (e.g., while waiting at a traffic light). As soon as power is requested, the engine is automatically restarted. The engine may also be automatically started in response to other conditions such as a decrease in battery state of charge or a gear lever being shifted from one gear to another. By avoiding unnecessary engine idling, the vehicle's fuel economy will be improved. For this reason, it is desirable to use the engine shutdown function as much as possible when engine auto-stop conditions are satisfied.

SUMMARY

In a vehicle provided with auto-stop/start capabilities, engine auto-stop delay times may be calibrated as a function of a state of charge of a battery.

An engine of a vehicle may be controlled by calibrating, by a controller, an engine auto-stop delay time based on a state of charge (SOC) of a battery. The calibrated engine auto-stop delay time increases as the SOC of the battery decreases, and decreases as the SOC of the battery increases. In response to an engine auto-stop event, the engine is shut down upon expiration of the calibrated engine auto-stop delay time. The controller may calibrate a first engine auto-stop delay time when the SOC of the battery is a first value, and may calibrate a second engine auto-stop delay time of a shorter duration than the first engine auto-stop delay time when the SOC of the battery is a second value that is greater than the first value. The first engine auto-stop delay time may be, for example, in a range of 3 to 13 seconds when the first value of the SOC of the battery is in a range of 50%-79%. The second engine auto-stop delay time may be, for example, in a range of 0 to 1 second when the second value of the SOC of the battery is in a range of 80%-100%. The controller may calibrate a third engine auto-stop delay time of a longer duration than the first engine auto-stop delay time when the SOC of the battery is a third value that is less than the first value. The third engine auto-stop delay time may be, for example, in a range of 23 to 88 seconds when the third value of the SOC of the battery is in a range of 20%-49%. The controller may calibrate a fourth engine auto-stop delay time of a longer duration than the third engine auto-stop delay time when the SOC of the battery is a fourth value that is less than the third value. The fourth engine auto-stop delay time may be, for example, in a range of 250 to 1,000 seconds when the fourth value of the SOC of the battery is in a range of 0%-19%.

A vehicle may include an engine configured for automatic shutdown and restart, a battery, and a controller. The controller may calibrate an engine auto-stop delay time based on a state of charge (SOC) of the battery, such that the calibrated engine auto-stop delay time increases as the SOC decreases, and decreases as the SOC increases. The controller may also shut down the engine upon expiration of the calibrated engine auto-stop delay time. The controller may calibrate a first engine auto-stop delay time when the SOC of the battery is a first value, and a second engine auto-stop delay time of a shorter duration than the first engine auto-stop delay time when the SOC of the battery is a second value that is greater than the first value. The controller may also calibrate a third engine auto-stop delay time of a longer duration than the first engine auto-stop delay time when the SOC of the battery is a third value that is less than the first value. The controller may also calibrate a fourth engine auto-stop delay time of a longer duration than the third engine auto-stop delay time when the SOC of the battery is a fourth value that is less than the third value.

A vehicle system may include a controller. The controller may receive an indication of a state of charge (SOC) of a battery. The controller may also calibrate an engine auto-stop delay time based on the SOC of the battery, such that the calibrated engine auto-stop delay time increases as the SOC decreases, and decreases as the SOC increases. The controller may also perform an engine shutdown according to the calibrated engine auto-stop delay time. The controller may calibrate a first engine auto-stop delay time when the SOC of the battery is a first value, and a second engine auto-stop delay time of a shorter duration than the first engine auto-stop delay time when the SOC of the battery is a second value that is greater than the first value. The controller may also calibrate a third engine auto-stop delay time of a longer duration than the first engine auto-stop delay time when the SOC of the battery is a third value that is less than the first value. The controller may also calibrate a fourth engine auto-stop delay time of a longer duration than the third engine auto-stop delay time when the SOC of the battery is a fourth value that is less than the third value.

Calibrating engine auto-stop delay times as a function of a state of charge of a battery may permit certain vehicles to experience an increase in fuel economy and/or may ensure that stop/start system durability expectations are maintained. The above advantages and other advantages and features associated with various embodiments of the present disclosure will be readily apparent from the following detailed description when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
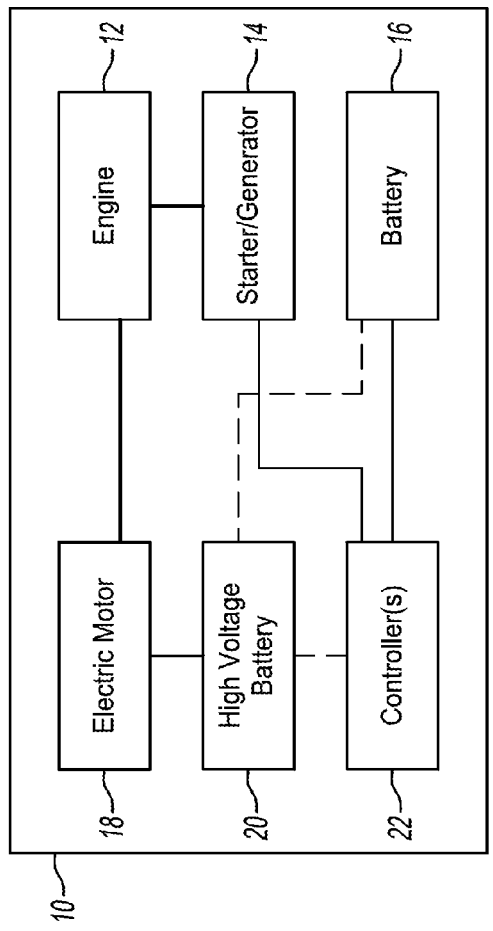
FIG. 1 is a block diagram of a hybrid vehicle.

Referring to FIG. 1, a hybrid vehicle 10, such as a hybrid electric vehicle or micro-hybrid vehicle, may include an engine 12, an engine starter/generator 14 (e.g., a belt starter/generator), and a battery 16 connected to the engine starter/generator 14. The engine 12 is mechanically connected with the engine starter/generator 14 (as indicated by the thick line) such that the engine 12 may drive the engine starter/generator 14 to generate electric current. The battery 16 is preferably a low voltage battery (e.g., a 12 V battery), but may also be a high voltage battery or any other suitable battery. The engine starter/generator 14 and battery 16 are electrically connected with each other (as indicated by the thin line). Hence, the engine starter/generator 14 may charge the battery 16.

In some approaches, such as in hybrid electric vehicles, the hybrid vehicle 10 also includes an electric motor or generator 18 powered by a battery, such as a high voltage battery 20. Other hybrid, micro-hybrid, or stop/start vehicle configurations are also contemplated.

The battery 16 is in communication with at least one controller 22. The controller 22 receives an indication of a state of charge (SOC) of the battery 16. The indication of the battery SOC may be expressed as a percentage, or any other suitable indication of the battery SOC. The indication of the battery SOC may be determined at the controller 22 or received at an input (not shown) of the controller 22.

The controller 22 can issue auto-stop commands (e.g., commands to stop the engine 12 during a drive cycle) and auto-start commands (e.g., commands to start the engine 12 during a drive cycle). As the vehicle 10 comes to a stop, for example, the controller 22 may issue a command to begin the process to stop the engine 12. As a brake pedal (not shown) is disengaged and/or an accelerator pedal (not shown) is engaged after an engine auto-stop, the controller 22 may issue a command to begin the process to start the engine 12. The engine 12 will be shut down in response to auto-stop commands and will be started in response to auto-start commands.

Figure 2:
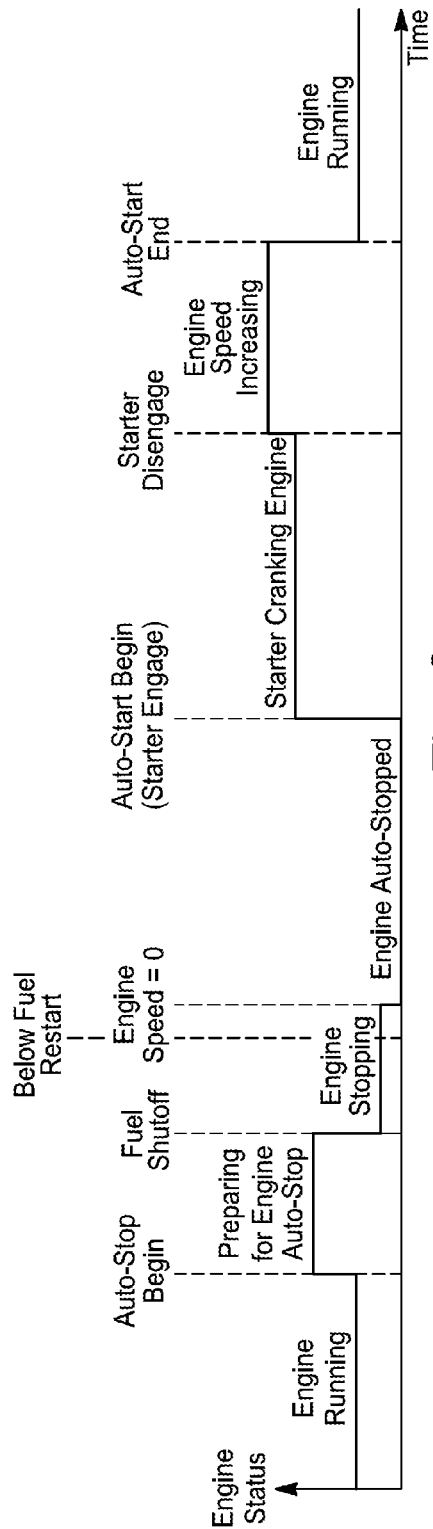
FIG. 2 is a plot of engine status versus time before, during and after an engine stop/start event.

Referring to FIG. 2, an engine auto-stop event may include several stages. "Auto-stop begin" marks the beginning of the engine auto-stop event. "Preparing for engine auto-stop" is the time period during which vehicle systems as well as the engine are prepared for the impending engine stop. If an auto-stop inhibit condition is detected during this stage, the preparation for the impending engine stop is discontinued and the vehicle systems and engine are returned to their normal operating modes. "Fuel shutoff" marks the point at which fuel flow to the engine is stopped. "Engine stopping" is the time period during which the engine speed decreases to 0. "Below fuel restart" marks the point after which if a restart is requested during the "engine stopping" stage, the starter may need to be engaged to crank the engine. If a restart is requested before "below fuel restart" and during the "engine stopping" stage, the engine may be restarted by turning the flow of fuel back on. "Engine speed=0" marks the point at which the engine speed is near or equal to 0.

"Engine auto-stopped" is the time period during which the engine is off. "Starter engage" marks the point at which the starter starts to crank the engine in an effort to start the engine in response to detecting an engine auto-start condition. "Starter cranking engine" is the time period during which the engine is unable to crank under its own power. "Starter disengage" marks the point at which the engine is able to crank under its own power. "Engine speed increasing" is the time period during which the speed of the engine increases to its running speed (a speed at or above target idle speed). "Auto-start end" marks the point at which the speed of the engine achieves its running speed.

Frequent stop/start events may cause system parameters to fall below minimum values such that an auto-start is not possible. Furthermore, because the battery is not charged during an engine auto-stop, its voltage and state of charge can drop to undesirable levels if current is drawn in large amounts or for extended periods of time. Referring again to FIG. 1, the controller 22 may first determine whether values of certain system parameters fall within specified ranges prior to initiating an auto-stop of the engine 12 (prior to "Auto-stop being"). These system parameters may include battery state of charge, battery voltage, and electric current demand. Other system parameters such as maximum engine auto-stop time, range of acceptable battery temperatures, etc., however, are also contemplated.

As an example, the controller 22 may determine if the battery voltage is greater than a predetermined threshold value. If not, the controller 22 may impede an auto-stop of the engine 12 as the vehicle 10 comes to a stop. In another example, the controller 22 may determine whether the electric current demand associated with the electrical load subsystems 18 is greater than some predetermined threshold value. If so, the controller 22 may impede an auto-stop of the engine 12 as the vehicle 10 comes to a stop, etc. In still another example, the controller 22 may determine whether the SOC of the battery 16 is sufficient to restart the engine 12. If not, the controller 22 may impede an auto-stop of the engine 12 as the vehicle 10 comes to a stop.

When a controller 22 impedes an engine auto-stop based on the SOC of the battery 16 falling below the SOC threshold necessary for an auto-start event, the fuel economy benefits of auto-stop/start systems are often squandered.

To prevent the SOC of the battery 16 from falling below the SOC threshold necessary for an auto-start event, the controller 22 may delay an auto-stop of the engine 12 for a period of time, thereby providing additional time for the SOC of the battery 16 to increase to the threshold necessary to restart the engine 12. To this end, the controller 22 may calibrate engine auto-stop delay times based on the SOC of the battery 16. An engine auto-stop delay time is a period of time following an auto-stop trigger condition and preceding shutdown of the engine, during which time the engine is not shut down. As the battery SOC decreases, the controller 22 calibrates increased engine auto-stop delay times. Similarly, as the battery SOC increases, the controller 22 calibrates decreased engine auto-stop delay times. The calibration of engine auto-stop delay times is preferably performed dynamically, i.e., during the drive cycle of the vehicle.

Figures 3, 4:
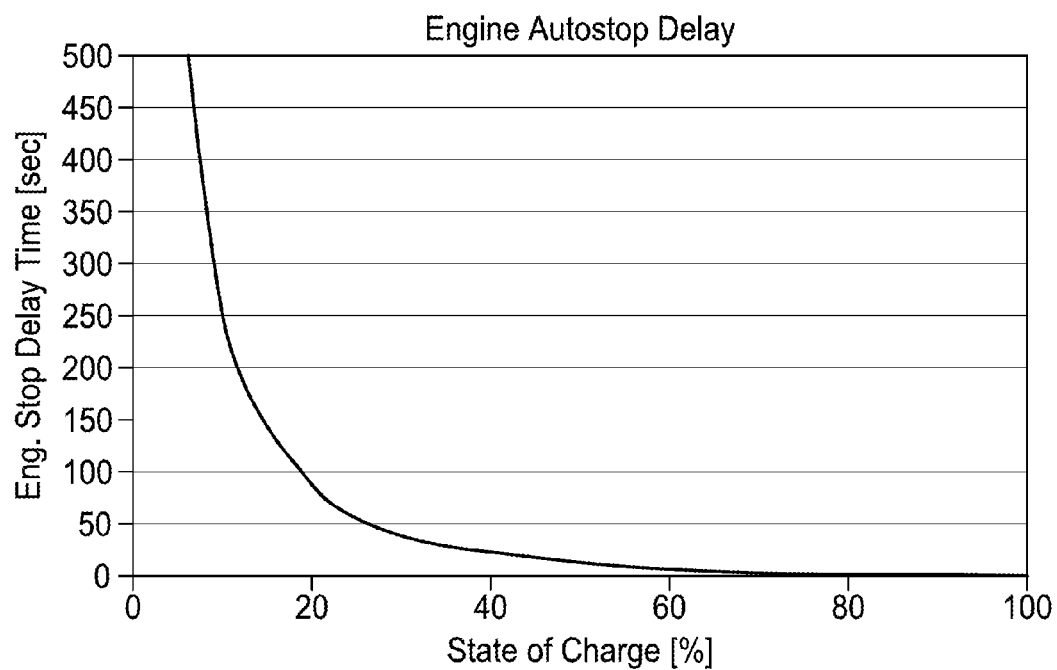
FIG. 3 is an exemplary engine auto-stop delay time calibration table.
FIG. 4 is another exemplary engine auto-stop delay time calibration table.

With reference to FIG. 3, the controller 22 calibrates engine auto-stop delay times based on the SOC of the battery 16. For example, when the SOC of the battery 16 is in the range of 50%-79%, the controller 22 may calibrate a first engine auto-stop delay time in the range of 3 to 13 seconds. More specifically, the controller 22 may calibrate an engine auto-stop delay time of 7 seconds when the battery SOC is 60%.

The controller 22 calibrates a second engine auto-stop delay time of a shorter duration than the first engine auto-stop delay time when the SOC of the battery increases. For example, when the SOC of the battery 16 is in the range of 80%-100%, the controller 22 may calibrate an engine auto-stop delay time in the range of 0 to 1 second. More specifically, the controller 22 may calibrate an engine auto-stop delay time of 1 second when the battery SOC is 80%, or 0 seconds, i.e., no engine auto-stop delay, when the battery SOC is 90%.

The controller 22 calibrates a third engine auto-stop delay time of a longer duration than the first engine auto-stop delay time when the SOC of the battery decreases. For example, when the SOC of the battery 16 is in the range of 20%-49%, the controller 22 may calibrate an engine auto-stop delay time in the range of 23 to 88 seconds. More specifically, the controller 22 may calibrate an engine auto-stop delay time of 39 seconds when the battery SOC is 30%.

The controller 22 calibrates a fourth engine auto-stop delay time of a longer duration than the third engine auto-stop delay time when the SOC of the battery decreases even more. For example, when the SOC of the battery 16 is in the range of 0%-19%, the controller 22 may calibrate an engine auto-stop delay time in the range of 250 to 1,000 seconds. More specifically, the controller 22 may calibrate an engine auto-stop delay time of 250 seconds when the battery SOC is 10%. As previously discussed, if the SOC of the battery 16 falls below a certain threshold such that the battery 16 would be insufficient to restart the engine 12, the controller 22 may prevent an auto-stop of the engine 12 as the vehicle 10 comes to a stop.

FIG. 4 provides additional exemplary engine auto-stop delay times calibrated as a of function battery SOC.

Through implementation of calibrated engine auto-stop delay times, as the battery SOC decreases, the controller 22 in effect gradually decreases the number of auto-stop/start events as would otherwise be expected. Decreasing the number of auto-stop/start events increases "engine running" time, thereby providing more time for the starter/generator 14 to replenish the SOC of the battery 16. By maintaining the battery SOC above the threshold SOC necessary to restart the engine 12, the controller 22 ensures a user of the vehicle 10 is provided with the fuel economy benefits of an auto-start/stop system.

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writable storage media such as floppy disks, magnetic tapes, CDs, RAM devices, and other magnetic and optical media. The processes, methods, or algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling an engine of a vehicle comprising:
    calibrating, by a controller, an engine auto-stop delay time based on a state of charge (SOC) of a battery, such that the calibrated engine auto-stop delay time increases as the SOC decreases, and decreases as the SOC increases; and
    in response to an engine auto-stop event, shutting down the engine upon expiration of the calibrated engine auto-stop delay time.

2. The method of claim 1, wherein the controller is configured to calibrate a first engine auto-stop delay time when the SOC of the battery is a first value, the controller further configured to calibrate a second engine auto-stop delay time of a shorter duration than the first engine auto-stop delay time when the SOC of the battery is a second value that is greater than the first value.

3. The method of claim 2, wherein the first engine auto-stop delay time is in a range of 3 to 13 seconds when the first value of the SOC of the battery is in a range of 50%-79%.

4. The method of claim 2, wherein the second engine auto-stop delay time is in a range of 0 to 1 second when the second value of the SOC of the battery is in a range of 80%-100%.

5. The method of claim 2, wherein the controller is configured to calibrate a third engine auto-stop delay time of a longer duration than the first engine auto-stop delay time when the SOC of the battery is a third value that is less than the first value.

6. The method of claim 5, wherein the third engine auto-stop delay time is in a range of 23 to 88 seconds when the third value of the SOC of the battery is in a range of 20%-49%.

7. The method of claim 5, wherein the controller is configured to calibrate a fourth engine auto-stop delay time of a longer duration than the third engine auto-stop delay time when the SOC of the battery is a fourth value that is less than the third value.

8. The method of claim 7, wherein the fourth engine auto-stop delay time is in a range of 250 to 1,000 seconds when the fourth value of the SOC of the battery is in a range of 0%-19%.

9. A vehicle comprising:
    an engine configured for automatic shutdown and restart;
    a battery; and
    a controller configured to calibrate an engine auto-stop delay time based on a state of charge (SOC) of the battery, such that the calibrated engine auto-stop delay time increases as the SOC decreases, and decreases as the SOC increases, the controller further configured to shut down the engine upon expiration of the calibrated engine auto-stop delay time.

10. The vehicle of claim 9, wherein the controller is configured to calibrate a first engine auto-stop delay time when the SOC of the battery is a first value, the controller further configured to calibrate a second engine auto-stop delay time of a shorter duration than the first engine auto-stop delay time when the SOC of the battery is a second value that is greater than the first value.

11. The vehicle of claim 10, wherein the controller is configured to calibrate a third engine auto-stop delay time of a longer duration than the first engine auto-stop delay time when the SOC of the battery is a third value that is less than the first value.

12. The vehicle of claim 11, wherein the controller is configured to calibrate a fourth engine auto-stop delay time of a longer duration than the third engine auto-stop delay time when the SOC of the battery is a fourth value that is less than the third value.

13. A vehicle system comprising:
a controller configured to:
receive an indication of a state of charge (SOC) of a battery;
calibrate an engine auto-stop delay time based on the SOC of the battery, such that the calibrated engine auto-stop delay time increases as the SOC decreases, and decreases as the SOC increases; and
perform an engine shutdown according to the calibrated engine auto-stop delay time.

14. The vehicle system of claim 13, wherein the controller is configured to calibrate a first engine auto-stop delay time when the SOC of the battery is a first value, the controller further configured to calibrate a second engine auto-stop delay time of a shorter duration than the first engine auto-stop delay time when the SOC of the battery is a second value that is greater than the first value.

15. The vehicle system of claim 14, wherein the controller is configured to calibrate a third engine auto-stop delay time of a longer duration than the first engine auto-stop delay time when the SOC of the battery is a third value that is less than the first value.

16. The vehicle system of claim 15, wherein the controller is configured to calibrate a fourth engine auto-stop delay time of a longer duration than the third engine auto-stop delay time when the SOC of the battery is a fourth value that is less than the third value.

* * * * *